US010282335B2

(12) United States Patent
Luo

(10) Patent No.: US 10,282,335 B2
(45) Date of Patent: May 7, 2019

(54) MULTIFUNCTIONAL PORTABLE DATA CARD AND DATA TRANSMISSION METHOD

(71) Applicant: Beijing Yuanlong Yato Culture Dissemination Co., Ltd., Beijing (CN)

(72) Inventor: Bailin Luo, Beijing (CN)

(73) Assignee: Beijing Yuanlong Yato Culture Dissemination Co., Ltd., Beijing (CN)

( * ) Notice: Subject to any disclaimer, the term of this patent is extended or adjusted under 35 U.S.C. 154(b) by 0 days.

(21) Appl. No.: 15/522,328

(22) PCT Filed: Mar. 24, 2015

(86) PCT No.: PCT/CN2015/074972
§ 371 (c)(1),
(2) Date: Apr. 27, 2017

(87) PCT Pub. No.: WO2016/065821
PCT Pub. Date: May 6, 2016

(65) Prior Publication Data
US 2017/0329734 A1    Nov. 16, 2017

(30) Foreign Application Priority Data

Oct. 27, 2014   (CN) .......................... 2014 1 0585041
Oct. 27, 2014   (CN) ..................... 2014 2 0628003 U

(51) Int. Cl.
*G06F 13/38* (2006.01)
*H04W 4/80* (2018.01)
(Continued)

(52) U.S. Cl.
CPC ............ *G06F 13/385* (2013.01); *G06F 13/38* (2013.01); *G06F 13/4295* (2013.01);
(Continued)

(58) Field of Classification Search
CPC ................ G06F 13/385; G06K 19/077; G06K 7/10237; H04B 5/0031
(Continued)

(56) References Cited

U.S. PATENT DOCUMENTS 7,044,368  B1 *  5/2006  Barron ................... G06K 19/07
                                                              235/380
2006/0026350 A1 *  2/2006  Lee ........................ G06F 3/0607
                                                              711/115
2012/0110214 A1 *  5/2012  Hahn .................... G06F 3/0607
                                                              710/11

FOREIGN PATENT DOCUMENTS

CN          101719169 A      6/2010
CN          103218328 A      7/2013
(Continued)

*Primary Examiner* — Shaima Q Aminzay
(74) *Attorney, Agent, or Firm* — Ling Wu; Stephen Yang; Ling and Yang Intellectual Property

(57) ABSTRACT

A multifunctional portable data card and a data transmission method are provided. The data card includes a main control module, a gear selection module, a data transmission module, an interface module and a storage module. The main control module detects a gear selection signal generated by the gear selection module, and sends a corresponding operation command to the data transmission module according to a working mode corresponding to the gear selection signal; the data transmission module performs data transmission in the data transmission mode or the OTG data processing mode after receiving the operation command; the interface module provides a port for interaction between the multifunctional portable data card and an external device; and the data card further includes the storage module.

13 Claims, 2 Drawing Sheets

(51) Int. Cl.
  *G06F 13/42* (2006.01)
  *G06K 7/00* (2006.01)
  *G06K 7/10* (2006.01)
  *G06K 19/077* (2006.01)
  *H04B 5/00* (2006.01)
  *H04W 56/00* (2009.01)
  *H04W 76/14* (2018.01)
  *H04L 29/06* (2006.01)

(52) U.S. Cl.
  CPC ....... *G06K 7/0008* (2013.01); *G06K 7/10237* (2013.01); *G06K 19/077* (2013.01); *H04B 5/0031* (2013.01); *H04W 4/80* (2018.02); *H04W 56/002* (2013.01); *H04L 69/08* (2013.01); *H04W 76/14* (2018.02)

(58) Field of Classification Search
  USPC ........................................................ 455/522
  See application file for complete search history.

(56) References Cited

FOREIGN PATENT DOCUMENTS

| | | |
|---|---|---|
| CN | 104317756 A | 1/2015 |
| CN | 204178362 U | 2/2015 |
| TW | 200707208 A | 2/2007 |

\* cited by examiner

MULTIFUNCTIONAL PORTABLE DATA CARD AND DATA TRANSMISSION METHOD

TECHNICAL FIELD

The present invention relates to the field of data card technology and data transmission technology, and more particularly to a multifunctional portable data card and a data transmission method.

BACKGROUND

The arrival of mobile Internet era makes intelligent mobile terminal equipment become gradually a communication and entertainment tool requisite to be carried by people in life, at work and on a journey. Moreover, with the rapid development of the On-The-Go (OTG) technology, data processing equipment between intelligent mobile terminals in an OTG mode also emerges as the times require. However, intelligent mobile terminals with which the current equipment can be connected are relatively simple and cannot simultaneously support data transmission between the intelligent mobile terminals and personal computers (PCs). In addition, since related portable devices only support universal serial bus (USB) or only support connection of card reader interfaces, to meet different demands, people usually have to carry a variety of data transmission and storage accessories in their luggage, this brings a lot of burden and inconvenience for people. Therefore, there is an urgent demand for developing a multifunctional portable device that can support multiple data transmission modes, can be connected with multiple intelligent mobile terminals, and can support both USB and card reader interfaces, thus reducing users' baggage burden and enhancing the users' experience.

SUMMARY

To solve the problems described above, the present invention proposes a multifunctional portable data card and a data transmission method, which can connect multiple intelligent mobile terminals, and support two types of data transmission modes, and support connection of both USB and card reader interfaces. The multifunctional portable data card has multiple functions and is compact and portable, reducing users' baggage burden and enhancing the users' experience.

To achieve the above objectives, the following technical scheme is adopted.

A multifunctional portable data card includes a main control module, a gear selection module, a data transmission module, an interface module and a storage module.

The gear selection module is configured to select a data transmission mode or On-The-Go (OTG) data processing mode under control of the main control module, and send a gear selection signal corresponding to the selected mode to the main control module.

The main control module is configured to detect the gear selection signal of the gear selection module and send an operation command corresponding to the gear selection signal to the data transmission module.

The data transmission module is configured to perform data transmission in the data transmission mode or the OTG data processing mode after receiving the operation command sent by the main control module.

The interface module is configured to connect one or more external devices and used as a port for interaction between the data card and the external device.

The storage module is configured to store data to be stored in the data card.

In an exemplary embodiment, the gear selection module includes two gear selection switches, a data transmission mode gear switch and an OTG data mode gear switch, respectively.

The data transmission mode gear switch is connected with a first input/output (I/O) port, and the OTG data mode gear switch is connected with a second I/O port, and the data transmission mode gear switch and the OTG data mode gear switch may not be in a closed status at the same time.

The data transmission mode gear switch is configured to support the data transmission mode after closed.

The OTG data mode gear switch is configured to support the OTG data processing mode after closed.

In an exemplary embodiment, the main control module includes the first I/O port, the second I/O port, and a first communication port.

The first I/O port and the second I/O port are connected with the data transmission mode gear switch and the OTG data mode gear switch, respectively.

The first communication port is connected with the data transmission module.

In an exemplary embodiment, the data transmission module includes a first path and a second path separated from each other, and a control unit connected with both the first path and the second path simultaneously.

The first path is configured to execute the data transmission mode.

The second path is configured to execute the OTG data processing mode.

The control unit is configured to control turn-on and turn-off of the first path and the second path.

In an exemplary embodiment, the first communication port of the main control module is connected with the control unit of the data transmission module.

In an exemplary embodiment, the interface module includes one or more portable connectors, a USB-A male connector, a card reader module and a hub.

The one or more portable connectors are configured to connect an intelligent mobile terminal/terminals.

The USB-A male connector is configured to connect a personal computer (PC).

The card reader module is configured to connect an intelligent card.

One end/ends of the one or more portable connectors is/are connected with a female connector/female connectors of one or more intelligent mobile terminals.

The card reader module and the other end/ends of the one or more portable connectors are connected with the data transmission module via the hub.

One end of the USB-A male connector is connected with a USB-B female connector of the PC and the other end is directly connected with the data transmission module.

In an exemplary embodiment, one end of the first path of the data transmission module is connected with the card reader module, and the one or more portable connectors and/or the storage module, and the other end is connected with the PC; and two ends of the second path of the data transmission module are connected with the card reader module and the one or more portable connectors, respectively.

In an exemplary embodiment, the portable connector includes a universal serial bus (USB) Type b, Mini USB-b, Micro USB-a, Micro USB-b, and Micro USB 3.0-b.

In an exemplary embodiment, the storage module includes a data storage card.

In an exemplary embodiment, the data card further includes an intelligent card-eject tool.

The intelligent card-eject tool is configured to take a subscriber identification module (SIM) intelligent card of the intelligent mobile terminal out from a card bin.

The intelligent card-eject tool is placed in a groove of a protective shell of the multifunctional portable data card.

In an exemplary embodiment, the data card further includes an indication module, the indication module is connected with a display output port of the main control module and configured to indicate whether a working mode in progress is running normally when the data transmission module executes the data transmission mode or OTG data processing mode.

A data processing method based on the multifunctional portable data card described above includes:

connecting, by the interface module, with one or more external devices;

selecting, by the gear selection module, the data transmission mode or the On-The-Go (OTG) data processing mode through two gear selection switches, and sending a gear selection signal corresponding to the selected mode to the main control module;

detecting, by the main control module, the gear selection signal of the gear selection module and sending an operation command corresponding to the gear selection signal to the data transmission module; and performing, by the data transmission module, data transmission in the data transmission mode or the OTG data processing mode after receiving the operation command.

In an exemplary embodiment, the step of selecting, by the gear selection module, the data transmission mode or the On-The-Go (OTG) data processing mode through two gear selection switches includes:

selecting, by the gear selection module, the data transmission mode by closing the data transmission mode gear switch; and selecting, by the gear selection module, the OTG data processing mode by closing the OTG data mode gear switch.

A computer program includes program instructions, and when the program instructions are executed by a computer, the computer is enabled to execute the data processing method described above.

A carrier carries the computer program.

Compared with the existing art, embodiments of the present invention include a multifunctional portable data card and a data transmission method. The data card includes a main control module, a gear selection module, a data transmission module, an interface module and a storage module. Herein, the main control module is configured to detect a gear selection signal of the gear selection module, and after a gear is selected, send a corresponding operation command to the data transmission module according to a working mode corresponding to the gear selection signal; the gear selection module is configured to select to execute a data transmission mode or On-The-Go (OTG) data processing mode by an opening or closing operation; the data transmission module is configured to perform data transmission in the data transmission mode or the OTG data processing mode after receiving the operation command sent by the main control module; the interface module is configured to connect one or more external devices and used as a port for interaction between the multifunctional portable data card and the external device; and the storage module is configured to store data to be stored in the multifunctional portable data card. According to the scheme of the present invention, the data card can connect multiple intelligent mobile terminals, and support two types of data transmission modes, and support connection of both USB and card reader interfaces. In addition, since the storage module is added into the data card, the data card can be used as a storage card while possessing transmission function, further improving the practicality of the data card. The data card in accordance with the embodiment of the present invention has multiple functions, and is compact and portable, thereby reducing users' baggage burden and enhancing the users' experience.

BRIEF DESCRIPTION OF THE DRAWINGS

The accompanying drawings in embodiments of the present invention will be described below, and are intended to provide a further understanding of the present invention and explain the present invention together with the specification, but not limit the protection scope of the embodiments of the present invention.

DETAILED DESCRIPTION

Figure 1:
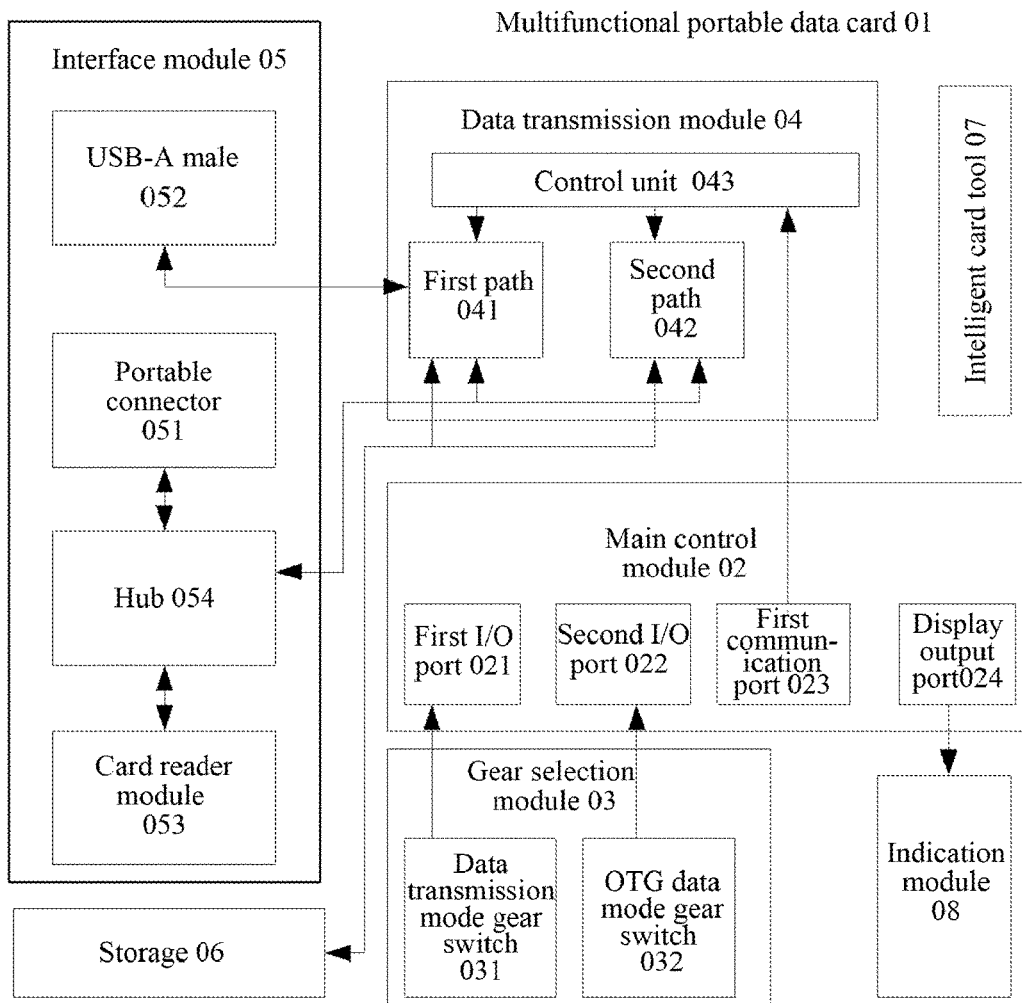
FIG. 1 is a structural block diagram of a multifunctional portable data card according to an embodiment of the present invention.
Figure 2:
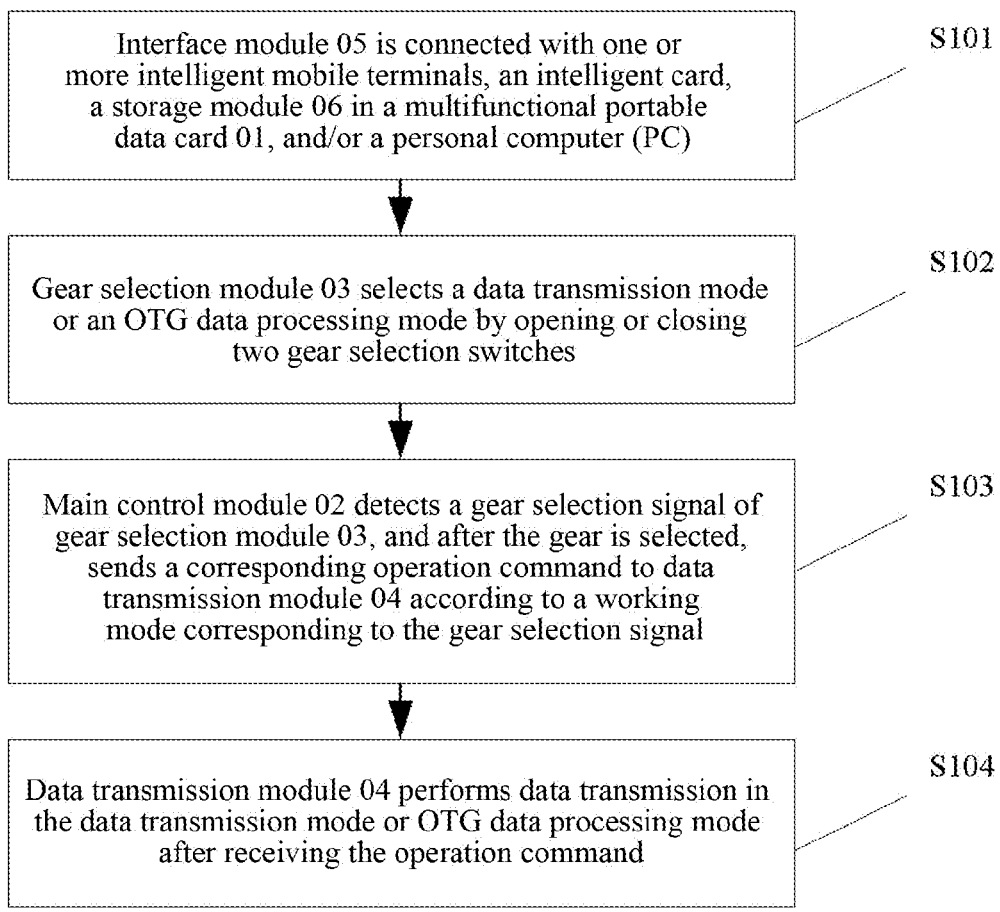
FIG. 2 is a flow chart of a data processing method based on a multifunctional portable data card according to an embodiment of the present invention.

For those skilled in the art to understand the present invention easily, the present invention will be further described in conjunction with the accompanying drawings, which are not intended to limit the protection scope of the present invention.

An embodiment of the present invention proposes a multifunctional portable data card 01 including a main control module 02, a gear selection module 03, a data transmission module 04, an interface module 05 and a storage module 06.

The main control module 02 is configured to detect a gear selection signal of the gear selection module 03, control the gear selection module to select a working mode corresponding to the gear selection signal, and after a gear is selected, send an operation command corresponding to the selected working mode to the data transmission module 04.

Alternatively, the main control module 02 includes a first input/output (I/O) port 021, a second I/O port 022, and a first communication port 023.

Alternatively, the main control module 02 sends the operation command corresponding to the selected working mode to the data transmission module 04 through the first communication port 023.

The first I/O port 021 and the second I/O port 022 are connected with the gear selection module 03; and the first communication port 023 is connected with the data transmission module 04.

The gear selection module 03 is configured to select a data transmission mode or OTG data processing mode.

Alternatively, the gear selection module 03 selects the data transmission mode or the OTG data processing mode by an opening and/or closing operation.

Alternatively, the gear selection module 03 includes two gear selection switches, i.e., a data transmission mode gear switch 031 and an OTG data mode gear switch 032, respectively.

The data transmission mode gear switch 031 is connected with the first I/O port 021; the OTG data mode gear switch 032 is connected with the second I/O port 022, and the data transmission mode gear switch 031 and the OTG data mode gear switch 032 may not be in a closed status at the same time.

The data transmission mode gear switch 031 is configured to support the data transmission mode after closed.

The OTG data mode gear switch 032 is configured to support the OTG data processing mode after closed.

The data transmission module 04 is configured to perform data transmission in the data transmission mode or the OTG data processing mode after receiving the operation command sent by the main control module 02.

Alternatively, the data transmission module 04 includes a first path 041 and a second path 042 separated from each other, and a control unit 043 connected with the first path 041 and the second path 042, respectively.

The first path 041 is configured to execute the data transmission mode.

The second path 042 is configured to execute the OTG data processing mode.

The control unit 043 is configured to control turn-on and turn-off of the first path 041 and the second path 042.

Alternatively, the first communication port 023 of the main control module 02 is connected with the control unit 043 of the data transmission module 04.

The interface module 05 is configured to connect one or more external devices and used as a port for interaction between the multifunctional portable data card 01 and the external device. In an exemplary embodiment, the external device may be an intelligent mobile terminal, an intelligent card, a storage module, and/or a personal computer (PC).

Alternatively, the interface module 05 includes one or more portable connectors 051, a USB-A male connector 052, a card reader module 053, and/or a hub 054.

The one or more portable connectors 051 are configured to connect an intelligent mobile terminal/terminals.

The USB-A male connector 052 is configured to connect a PC.

One end of the card reader module 053 is connected with an intelligent card. One end/ends of the one or more portable connectors 051 is/are connected with a female connector/female connectors of one or more intelligent mobile terminals.

The card reader module 053 and the other end/ends of the one or more portable connectors 051 are connected with the data transmission module 04 via the hub 054.

One end of the USB-A male connector 052 is connected with a USB-B female connector of the PC and the other end is directly connected with the data transmission module 04.

Alternatively, one end of the first path 041 of the data transmission module 04 is connected with the hub 054 and/or the storage module 06; and the other end of the first path 041 is connected with the PC. Two ends of the second path 042 of the data transmission module 04 are connected with the card reader module 053 and/or the one or more portable connectors 051, respectively.

Herein, the portable connectors include, but are not limited to, a USB Type b, Mini USB-b, Micro USB-a, Micro USB-b, and Micro USB 3.0-b.

The storage module 06 is configured to store the data to be stored.

Alternatively, the storage module includes, but is not limited to, a data storage card.

Alternatively, the multifunctional portable data card 01 further includes an intelligent card-eject tool 07 configured to take a subscriber identification module (SIM) intelligent card of the intelligent mobile terminal from a card bin.

The intelligent card-eject tool 07 is placed in a groove of a protective shell of the multifunctional portable data card and is opened or retracted by rotation.

Alternatively, the multifunctional portable data card 01 further includes an indication module 08 connected with a display output port 024 of the main control module 02 and configured to indicate whether a working mode in progress is running normally when the data transmission module executes the data transmission mode or OTG data processing mode.

An embodiment of the present invention further proposes a data processing method based on the multifunctional portable data card comprising the following steps S101-S104.

In step S101, the interface module 05 is connected with one or more external devices, such as an intelligent mobile terminal, an intelligent card, a storage module 06 in the multifunctional portable data card 01, and/or a personal computer (PC).

In step S102, the gear selection module 03 selects a data transmission mode or OTG data processing mode through two gear selection switches.

Alternatively, the gear selection module 03 selects to execute the data transmission mode or the OTG data processing mode by opening or closing the two gear selection switches.

Alternatively, the two gear switches cannot be in the closed status at the same time; and the two gear selection switches include a data transmission mode gear switch 031 and an OTG data mode gear switch 032.

The step that the gear selection module 03 selects the data transmission mode or the OTG data processing mode through two gear selection switches includes:

selecting the data transmission mode by closing the data transmission mode gear switch 031; and selecting the OTG data processing mode by closing the OTG data mode gear switch 032.

In step S103, the main control module 02 detects a gear selection signal of the gear selection module 03 and sends an operation command corresponding to the gear selection signal to the data transmission module 04.

Before the step S103, the step further includes that the gear selection module 03 sends the gear selection signal corresponding to the selected mode to the main control module 02.

Alternatively, the step that the main control module 02 sends the operation command corresponding to the gear selection signal to the data transmission module 04 includes:

when the data transmission mode gear switch 031 of the gear selection module 03 is closed, the main control module 02 commands the control unit 043 of the data transmission module 04 to control the first path 041 to be turn-on to execute the data transmission mode; and when the OTG data mode gear switch 032 of the gear selection module 03 is closed, the main control module 02 commands the control unit 043 of the data transmission module 04 to control the second path 041 to be turn-on to execute the OTG data processing mode.

In step S104, the data transmission module 04 performs data transmission in the data transmission mode or the OTG data processing mode after receiving the operation command.

Alternatively, the data transmission mode refers to as that data transmission can be performed between the intelligent mobile terminal, the intelligent card and/or the storage module 06 of the multifunctional portable data card respectively and the personal computer (PC); and the PC identifies and controls data information in the intelligent mobile terminal, the intelligent card and/or the storage module 06.

The PC simultaneously identifies and controls the data information in all intelligent mobile terminals, the intelligent card and/or the storage module 06 when the one or more portable connectors 051 and the card reader module 053 are all connected with the intelligent mobile terminals or the intelligent card; and the PC only identifies and controls the data information in the connected intelligent mobile terminals, intelligent card and/or storage module 06 when any one of the one or more portable connectors 051 and the card reader module 053 is not connected with any intelligent mobile terminal or intelligent card.

Alternatively, the OTG data processing mode refers to data processing between the intelligent mobile terminal and the intelligent card, between multiple intelligent mobile terminals, or between multiple intelligent mobile terminals and/or intelligent card and the storage module 06 in the OTG mode.

Alternatively, the method further includes, before performing data processing, a subscriber identification module (SIM) intelligent card of the intelligent mobile terminal is taken from a card bin by using an intelligent card-eject tool placed in a groove of a protective shell of the multifunctional portable data card 01.

The intelligent card-eject tool 07 is opened or retracted by rotation.

Alternatively, the method further includes: whether the working mode in progress is running normally is indicated by using an indication module 08 when the data transmission module executes the data transmission mode or OTG data processing mode.

An embodiment of the present invention further discloses a computer program including program instructions, and when the program instructions are executed by a computer, the computer is enabled to perform the data processing method described above.

An embodiment of the present invention further discloses a carrier carrying the computer program.

Based on the design idea "perfection, simplicity, ultra-thin and portability" of the multifunctional portable data card 01 in accordance with embodiments of the present invention, a charging line, a data synchronization line, a data storage card supporting various standards such as MicroSD (TF)/SD (MMC), and a SIM card-eject tool are integrated in a space with a size of a credit card, and through the OTG technology, it can be more easy to provide extended storage space and document backup for an intelligent mobile terminal equipment, and can further store documents from the traditional digital devices, such as digital cameras, into intelligent mobile terminal devices for sharing anytime and anywhere. Light and thin appearance design can make the multifunctional portable data card be put easily into a card holder or wallet, reducing greatly the burden that various peripheral accessories of intelligent mobile terminal equipment bring to people, facilitating travel and adding fun.

It needs to be noted that the embodiments described above are merely for the purpose of understanding by those skilled in the art and are not intended to limit the protection scope of the present invention, and any obvious substitution and improvement made to the present invention by those skilled in the art are within the protection scope of the present invention without departing from the inventive concept of the present invention.

INDUSTRIAL APPLICABILITY

The multifunctional portable data card and the data transmission method in accordance with the embodiments of the invention can connect multiple intelligent mobile terminals, support two types of data transmission modes and support connection of both USB and the card reader interface. The multifunctional portable data card has multiple functions and is compact and portable, reducing users' baggage burden and enhancing the users' experience. The present invention therefore has a strong industrial applicability.

I claim:

1. A multifunctional portable data card, comprising a main control module, a gear selection module, a data transmission module, an interface module and a storage module, wherein
the gear selection module is configured to select a data transmission mode or On-The-Go, OTG, data processing mode under control of the main control module, and send a gear selection signal corresponding to the selected mode to the main control module;
the main control module is configured to detect the gear selection signal of the gear selection module and send an operation command corresponding to the gear selection signal to the data transmission module;
the data transmission module is configured to perform data transmission in the data transmission mode or the OTG data processing mode after receiving the operation command sent by the main control module;
the interface module is configured to connect one or more external devices and used as a port for interaction between the data card and the external device; and
the storage module is configured to store data to be stored in the data card; wherein
the gear selection module comprises two gear selection switches, a data transmission mode gear switch and an OTG data mode gear switch, respectively, wherein
the data transmission mode gear switch is connected with a first input/output, I/O, port, and the OTG data mode gear switch is connected with a second I/O port, and the data transmission mode gear switch and the OTG data mode gear switch are not in a closed status at a same time;
the data transmission mode gear switch is configured to support the data transmission mode after closed; and
the OTG data mode gear switch is configured to support the OTG data processing mode after closed.

2. The multifunctional portable data card according to claim 1, wherein the main control module comprises the first I/O port, the second I/O port, and a first communication port, wherein
the first I/O port and the second I/O port are connected with the data transmission mode gear switch and the OTG data mode gear switch, respectively; and
the first communication port is connected with the data transmission module.

3. The multifunctional portable data card according to claim 2, wherein the data transmission module comprises a first path and a second path separated from each other, and a control unit connected with both the first path and the second path simultaneously, wherein
the first path is configured to execute the data transmission mode;
the second path is configured to execute the OTG data processing mode; and
the control unit is configured to control turn-on and turn-off of the first path and the second path.

4. The multifunctional portable data card according to claim 3, wherein the first communication port of the main control module is connected with the control unit of the data transmission module.

5. The multifunctional portable data card according to claim 4, wherein the interface module comprises one or more portable connectors, a universal serial bus, a USB-A male connector, a card reader module and a hub, wherein
the one or more portable connectors are configured to connect an intelligent mobile terminal/terminals;
the USB-A male connector is configured to connect a Personal Computer, PC;
the card reader module is configured to connect an intelligent card;
one end/ends of the one or more portable connectors is/are connected with a female connector/female connectors of one or more intelligent mobile terminals;
the card reader module and the other end/ends of the one or more portable connectors are connected with the data transmission module via the hub; and
one end of the USB-A male connector is connected with a USB-B female connector of the PC, and the other end is directly connected with the data transmission module.

6. The multifunctional portable data card according to claim 5, wherein
one end of the first path of the data transmission module is connected with the card reader module, and the one or more portable connectors and/or the storage module, and the other end is connected with the PC; and
two ends of the second path of the data transmission module are connected with the card reader module and the one or more portable connectors, respectively.

7. The multifunctional portable data card according to claim 5, wherein the portable connector comprises a universal serial bus, USB, Type b, Mini universal serial bus, USB-b, Micro universal serial bus, USB-A, Micro USB-b, and Micro USB 3.0-b.

8. The multifunctional portable data card according to claim 1, wherein the storage module comprises a data storage card.

9. The multifunctional portable data card according to claim 1, wherein the data card further comprises an intelligent card-eject tool, wherein
the intelligent card-eject tool is configured to take a subscriber identification module, SIM, intelligent card of the intelligent mobile terminal out from a card bin; and
the intelligent card-eject tool is placed in a groove of a protective shell of the multifunctional portable data card.

10. The multifunctional portable data card according to claim 1, wherein the data card further comprises an indication module, the indication module is connected with a display output port of the main control module and configured to indicate whether a working mode in progress is running normally when the data transmission module executes the data transmission mode or OTG data processing mode.

11. The data processing method based on the multifunctional portable data card according to claim 1, comprising:
connecting, by the interface module, with one or more external devices;
selecting, by the gear selection module, the data transmission mode or the On-The-Go, OTG, data processing mode through two gear selection switches, and sending a gear selection signal corresponding to the selected mode to the main control module;
detecting, by the main control module, the gear selection signal of the gear selection module, and sending an operation command corresponding to the gear selection signal to the data transmission module; and
performing, by the data transmission module, data transmission in the data transmission mode or the OTG data processing mode after receiving the operation command.

12. The data processing method according to claim 11, wherein the step of selecting, by the gear selection module, the data transmission mode or the On-The-Go, OTG, data processing mode through two gear selection switches comprises:
selecting, by the gear selection module, the data transmission mode by closing the data transmission mode gear switch; and
selecting, by the gear selection module, the OTG data processing mode by closing the OTG data mode gear switch.

13. A non-transitory computer-readable medium storing a computer program, wherein the computer program comprising program instructions, when the program instructions are executed by a computer, the computer is enabled to execute the data processing method based on the multifunctional portable data card according to claim 1, comprising:
connecting, by the interface module, with one or more external devices;
selecting, by the gear selection module, the data transmission mode or the On-The-Go, OTG, data processing mode through two gear selection switches, and sending a gear selection signal corresponding to the selected mode to the main control module;
detecting, by the main control module, the gear selection signal of the gear selection module, and sending an operation command corresponding to the gear selection signal to the data transmission module; and
performing, by the data transmission module, data transmission in the data transmission mode or the OTG data processing mode after receiving the operation command.

* * * * *